(12) United States Patent
Jacquot

(10) Patent No.: US 7,890,292 B2
(45) Date of Patent: Feb. 15, 2011

(54) METHOD AND SYSTEM FOR MEASURING A DIAMETER, AND ASSEMBLY LINE EMPLOYING THIS SYSTEM

(75) Inventor: Claude Jacquot, Saint Eustache (FR)

(73) Assignee: Staubli Faverges, Faverges (FR)

( * ) Notice: Subject to any disclaimer, the term of this patent is extended or adjusted under 35 U.S.C. 154(b) by 186 days.

(21) Appl. No.: 12/224,169

(22) PCT Filed: Feb. 26, 2007

(86) PCT No.: PCT/FR2007/000338

§ 371 (c)(1),
(2), (4) Date: Nov. 21, 2008

(87) PCT Pub. No.: WO2007/096533

PCT Pub. Date: Aug. 30, 2007

(65) Prior Publication Data

US 2009/0259433 A1    Oct. 15, 2009

(30) Foreign Application Priority Data

Feb. 27, 2006    (FR) .................................. 06 01694

(51) Int. Cl.
*G01B 21/10* (2006.01)
(52) U.S. Cl. ..................................... 702/157
(58) Field of Classification Search .................. 702/157, 702/159; 33/542, 555.2
See application file for complete search history.

(56) References Cited

U.S. PATENT DOCUMENTS

| 6,175,813 | B1 * | 1/2001 | Purchase et al. ............ 702/157 |
| 6,289,600 | B1 | 9/2001 | Watts |
| 6,332,265 | B1 | 12/2001 | Tonooka |
| 2003/0189713 | A1 | 10/2003 | Chemo |

FOREIGN PATENT DOCUMENTS

JP    07 167790    7/1995

* cited by examiner

*Primary Examiner*—Drew A Dunn
*Assistant Examiner*—Stephen J Cherry
(74) *Attorney, Agent, or Firm*—Dowell & Dowell, P.C.

(57) ABSTRACT

This method for measuring the diameter of a circular track on a component comprises: a) a step (162) of moving the component along a measurement path, b) as the component is moving along the measurement path, a measurement step (170), for measuring at least one parameter, without contact with the component, c) a step (186) of determining the diameter of the circular track from the parameters measured. During step a) a robot continuously moves the component at an instantaneous speed that is never zero along the measurement path and an instantaneous acceleration that never changes sign along the measurement path.

10 Claims, 6 Drawing Sheets

Figure 1:
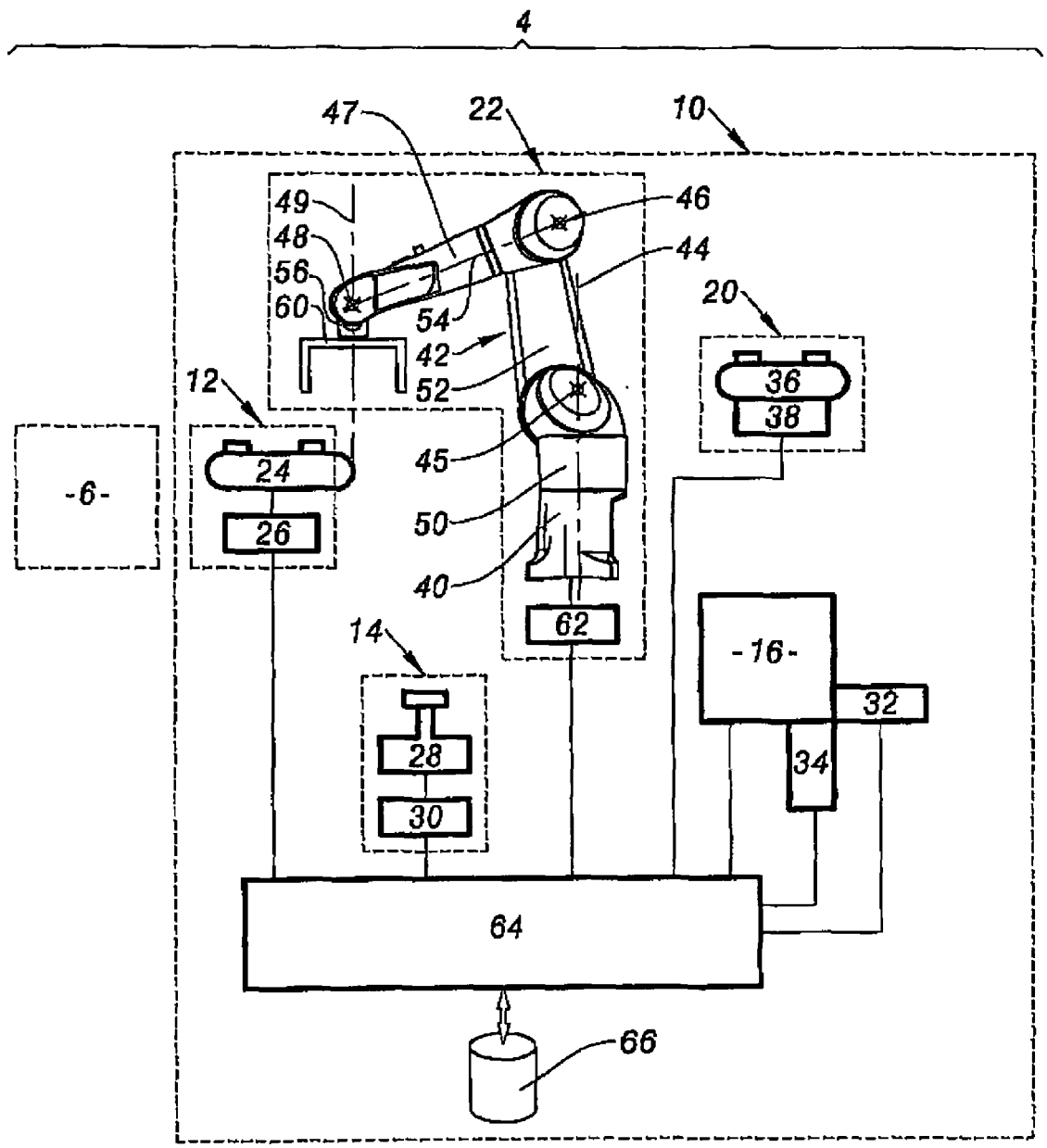

METHOD AND SYSTEM FOR MEASURING A DIAMETER, AND ASSEMBLY LINE EMPLOYING THIS SYSTEM

The present invention relates to a method and a system for measuring a diameter, and an assembly line employing this system.

Methods exist for measuring the diameter of a circular track on a component comprising:
a) a step for moving the component along a measurement trajectory,
b) when the component is moved along the measurement trajectory, a step for measuring, without contact with the component, at least one quantity that is a function of the diameter of the circular track,
c) a step for determining the diameter of the circular track based on the quantities measured at several measurement points along the measurement trajectory.

In the existing methods, a stepper motor is used for moving the component along the measurement trajectory. Thus, the component is moved by a pre-determined step then stopped. When the component is stopped, the step b) is executed. Subsequently, the component is moved again by a pre-determined step then again stopped in order to execute the step b) once again. This mode of operation is reiterated along the whole measurement trajectory.

This method gives satisfactory results. However, it is desirable to improve even more the precision of the measurement of the diameter and, above all, to enable a faster measurement.

The invention aims to satisfy this desire by providing a more precise and faster measurement of the diameter of a circular track on a component.

A subject of the invention is therefore such a method in which the step a) is carried out by means of a robot formed from a fixed base and from a manipulator arm articulated about at least two axes, the end of the manipulator arm being equipped with a gripping mechanism capable of grasping and holding the component, and in which, during the step a), the robot moves the component in a continuous manner with an instantaneous speed which is never zero along the measurement trajectory and an instantaneous acceleration which never changes sign along the measurement trajectory.

In the method provided hereinabove, the component is moved in a continuous manner along the measurement trajectory with an instantaneous acceleration which never changes sign. In this way, under the effect of this acceleration, the sequence of operations is maintained all along the trajectory in a configuration in which the slack in the movements is taken up. Under these conditions, the successive measurements advance in a regular manner which affords a greater precision to the interpolations carried out in the step c).

The embodiments of this method may comprise one or more of the following features:
during the measurement step, at least two quantities are simultaneously measured with respective sensors at each measurement point along the measurement trajectory, each of these quantities is representative of the distance that separates the sensor that has measured it from the circular track in a direction of measurement, the measurement directions used for measuring these two quantities being opposite and the distance between the sensors being kept constant;
the step a) is carried out by means of a robot whose articulated arm has a mass greater than or equal to 20 kg;
during the step a), only one articulation of the robot is controlled;
the step b) is carried out by means of at least one sensor comprising:
a source of a collimated light beam capable of projecting a luminous pattern onto the circular track,
a camera capable of acquiring an image of the luminous pattern projected onto the circular track, and
by means of a processor capable of processing the acquired images in order to deduce from these the quantity that is a function of the diameter of the circular track;
the step a) is carried out with an arm whose static positioning error with respect to a given position is strictly greater than the maximum acceptable error on the measurement of the diameter of the circular track, the static positioning error being the maximum error obtained between a target position for the gripping mechanism and a position at which the gripping mechanism actually stops when the robot tries to place this mechanism on the target position.

These embodiments of the method also have the following advantages:
simultaneously measuring the quantities that are functions of the diameter allows the precision of the measurement of the diameter to be increased since the position of a sensor with respect to the other at the time when the measurement is made can be known with a high accuracy,
using a robot arm whose mass is greater than 20 kg allows the high-frequency components of the vibrations to be eliminated when it is moved along the measurement trajectory, which increases the precision of the measurement of the diameter,
controlling a single articulation of the robot in order to move the component along the measurement trajectory allows the vibrations to be reduced, which increases the precision of the measurement of the diameter,
deducing the quantities that are functions of the diameter by image processing allows these quantities to be very precisely measured and renders the method insensitive to small errors in positioning of the sensors with respect to a plane parallel to the circular track,
using a robot whose static error is strictly greater than the desired precision of the measurement simplifies the implementation of the method because the latter does not require the use of a complex and costly robot.

A further subject of the invention is a system for measuring the diameter of a circular track on a component, this system comprising:
at least one sensor for measuring, without contact with the component, when the component is moved along a measurement trajectory, a quantity that is a function of the diameter of the circular track, and
a processor for determining the diameter of the circular track from the quantities measured at several measurement points along the measurement trajectory,
an articulated robot formed from a fixed base supporting a manipulator arm articulated about at least two axes, the end of the manipulator arm being equipped with a gripping mechanism for grasping and holding the component, this robot being capable of moving the component along the measurement trajectory, and
at least one controller for implementing the measurement method hereinabove.

Yet another subject of the invention is an assembly line for a component having a circular track, this line comprising:
an upstream station for the automatic supply of components to be assembled, a system for measuring the diameter of the circular track of the component to be assembled, and a downstream station for processing the component according to the measured diameter of the circular track or for receiving the component.

In addition, in this assembly line, the measurement system is that described hereinabove and the robot used in the measurement system is also capable of automatically transferring the component from the upstream station toward the measurement system and from the measurement system toward the downstream station with no human intervention and without releasing the component.

This assembly line has the following advantage:
using the robot of the measurement system for the automatic transfer of the components from the upstream station toward the downstream station makes the assembly line faster because the robot does not have to release the component when the diameter of the circular track is measured.

The embodiments of the assembly line may comprise one or more of the following features:
the processing station is a station for assembling the component with complementary components selected according to the diameter measured;
the component is a bearing ring of a ball bearing comprising a circular track designed to receive the balls and in which the complementary components are the set of balls received in the circular track and the other retaining ring of the bearing.

Figure 2:
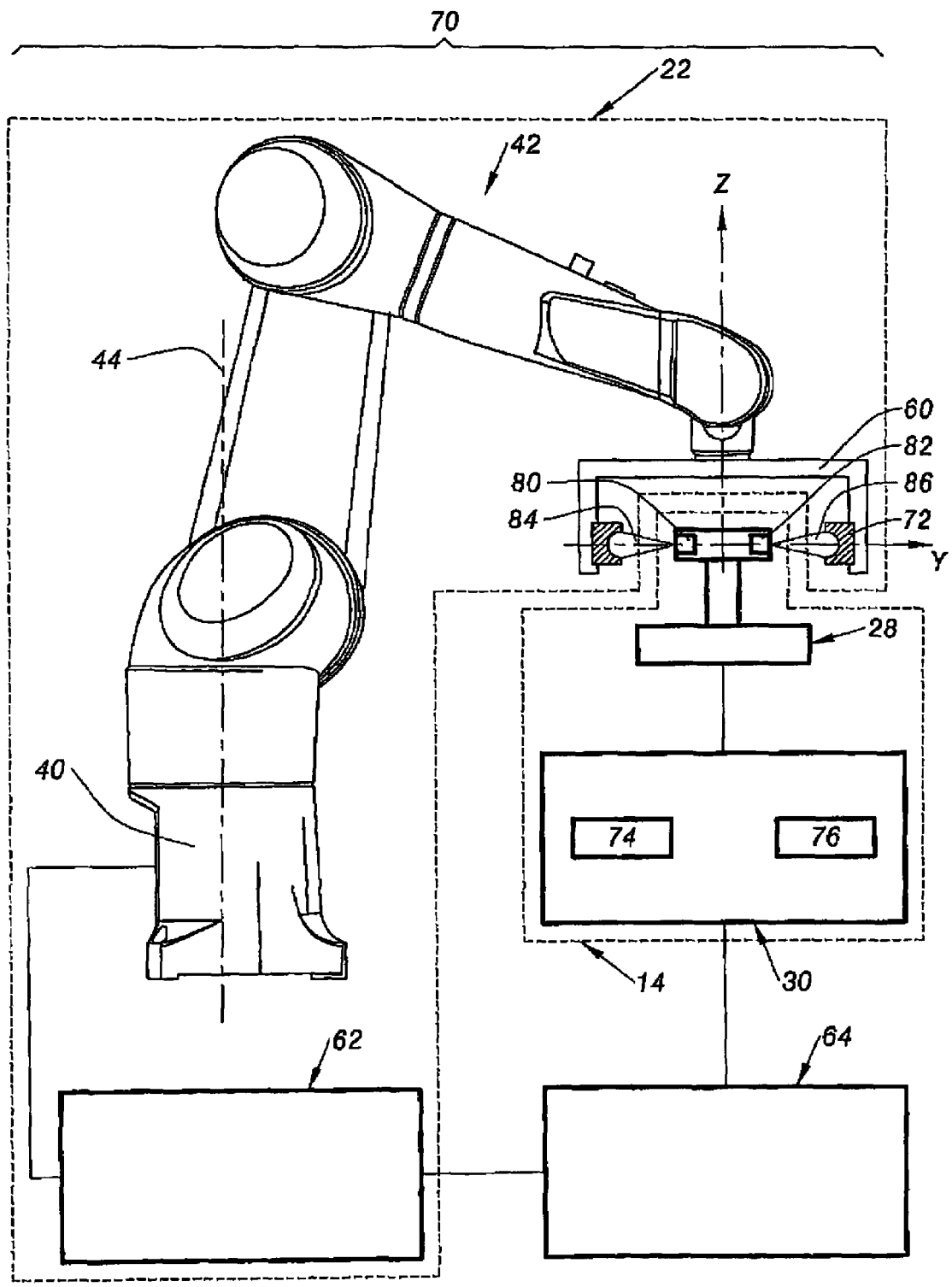
Figure 3:
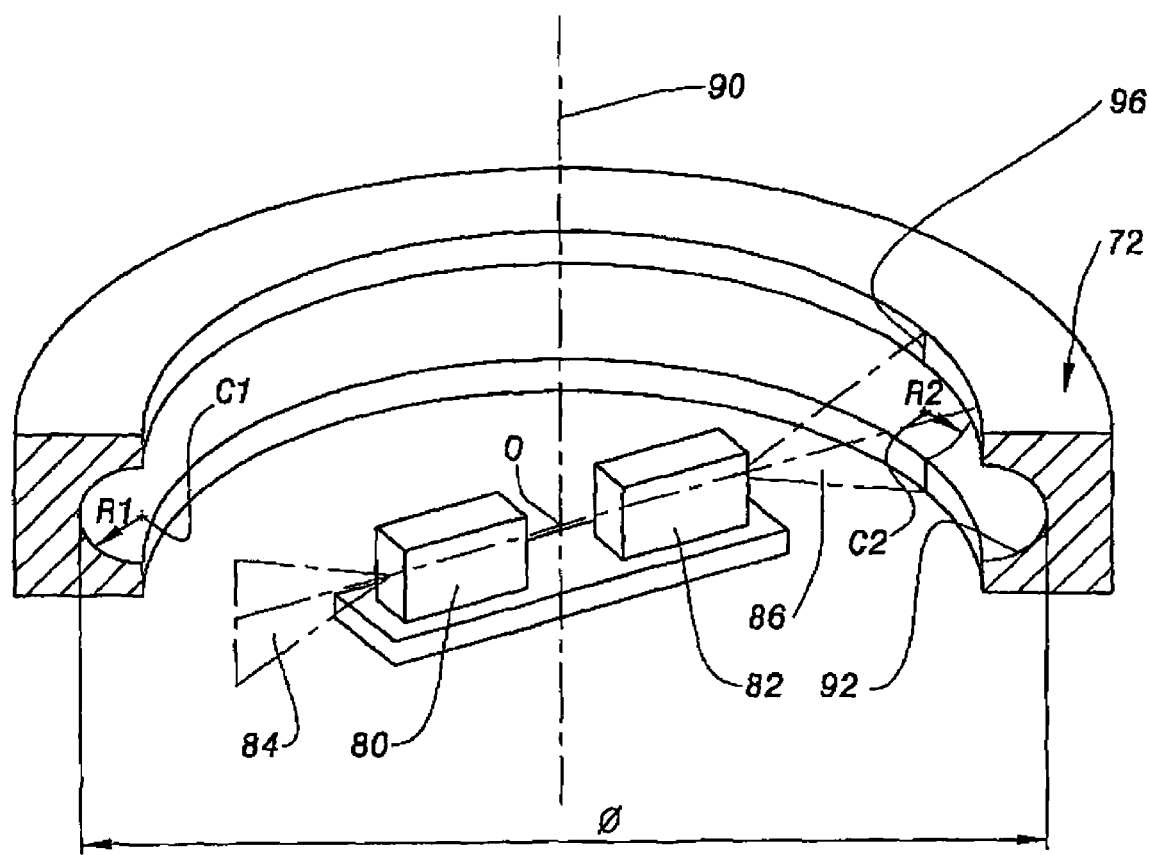
Figure 4:
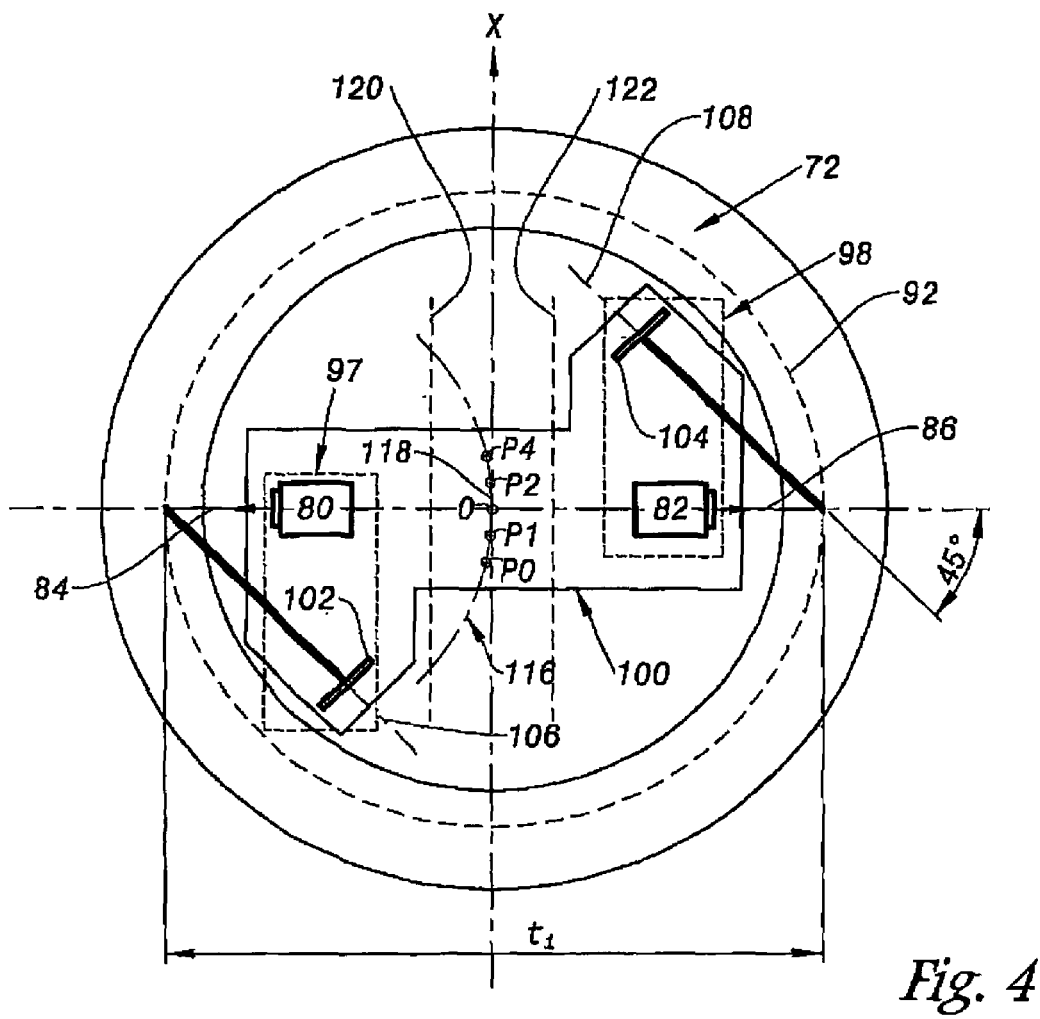
Figure 5:
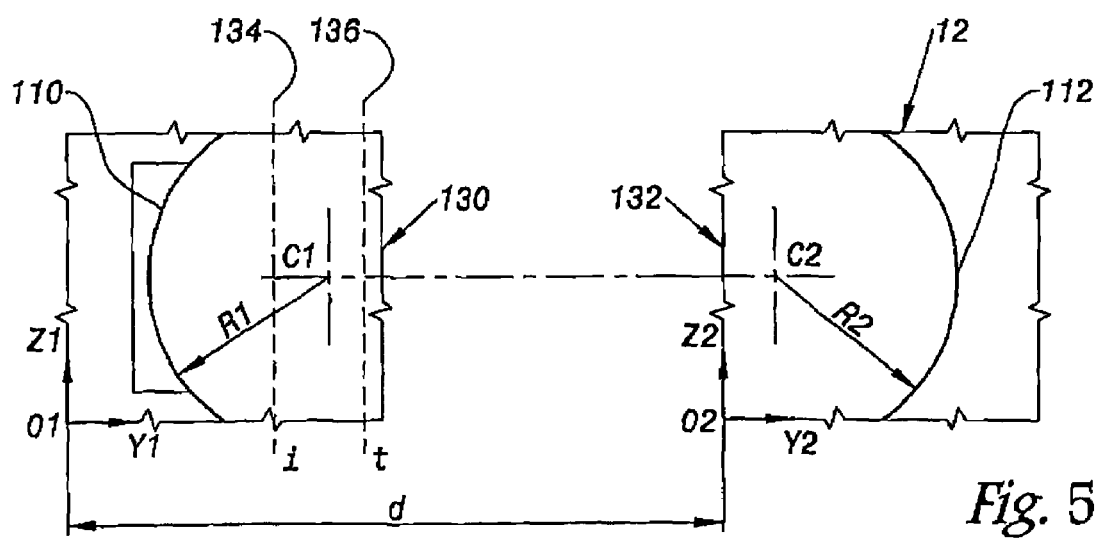
Figure 6:
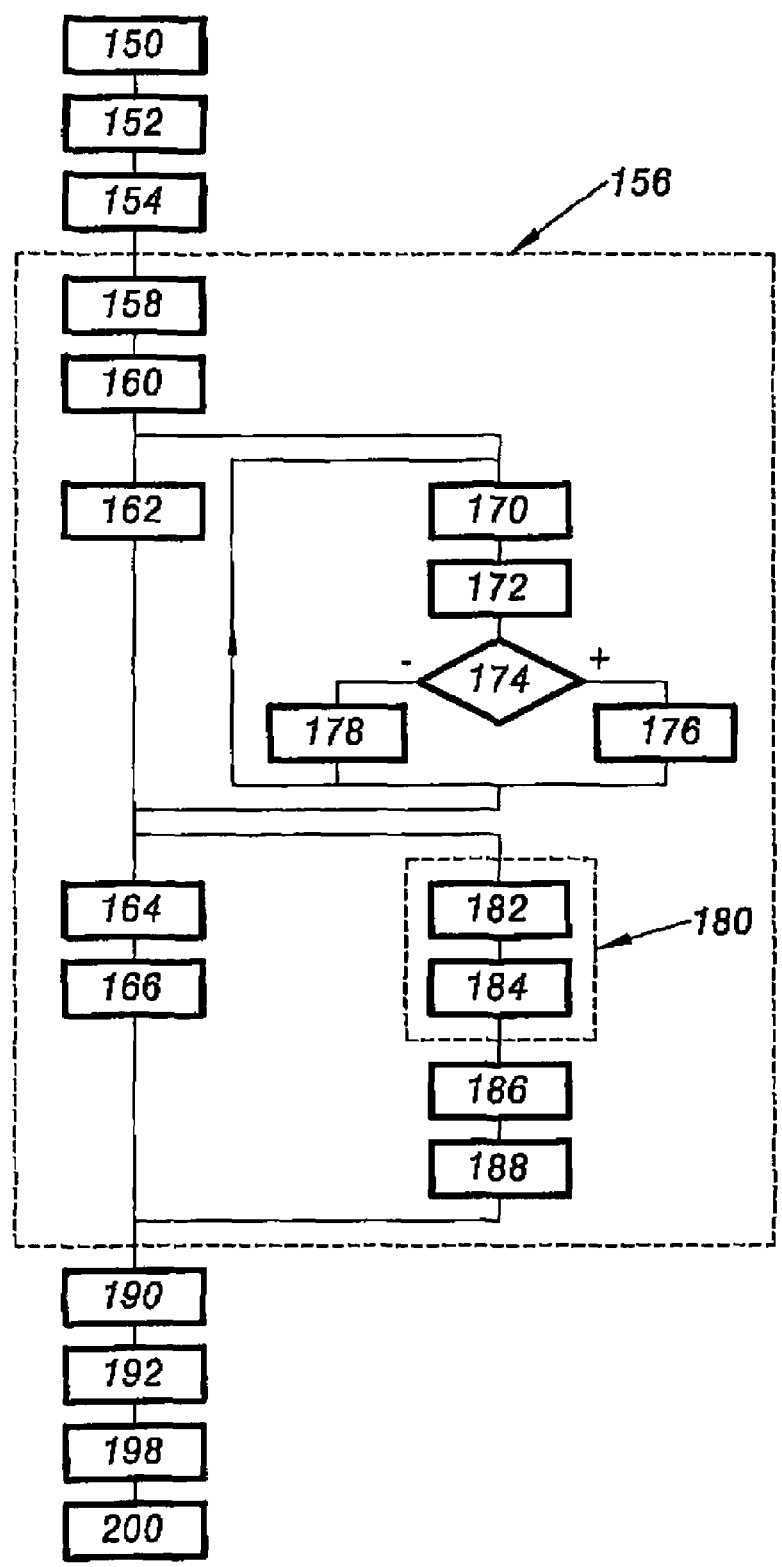
Figure 7A:
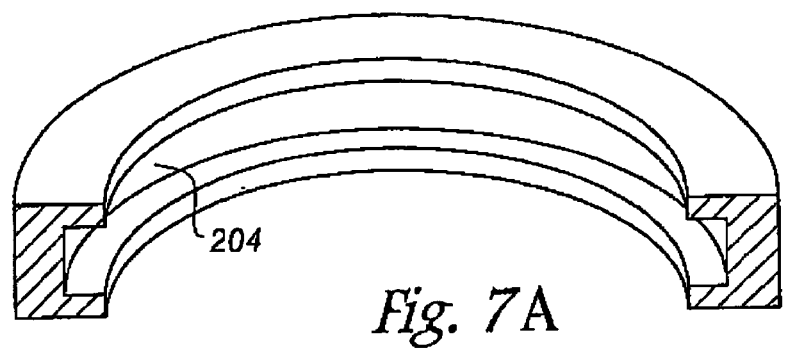
Figure 7B:
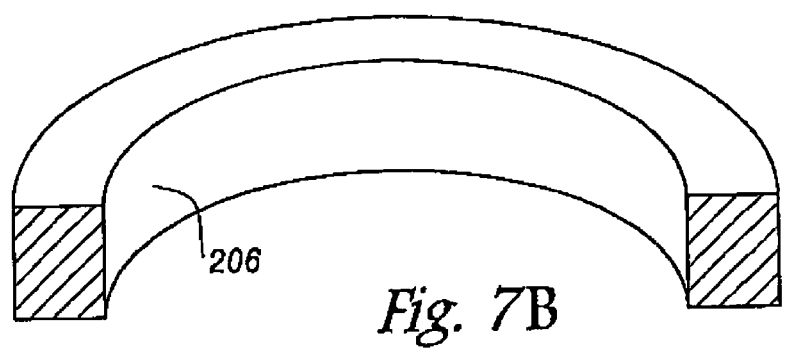
Figure 8:
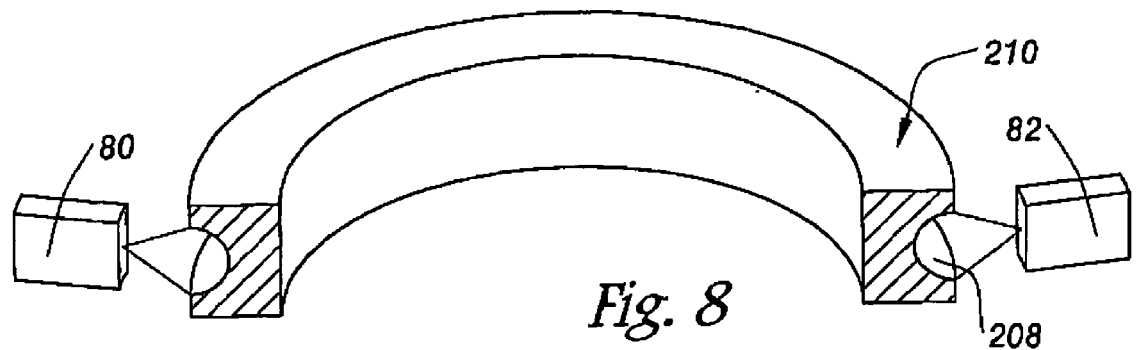

The invention will be better understood upon reading the description that follows, presented solely by way of non-limiting example and with reference to the drawings in which:

FIG. 1 is a schematic illustration of an assembly line for a ball bearing,

FIG. 2 is a schematic illustration of a system for measuring the diameter of a circular track implemented in the assembly line in FIG. 1, FIG. 3 is a schematic perspective-view illustration of half an external ring for a ball bearing assembled by means of the assembly line in FIG. 1, FIG. 4 is a schematic top-view illustration of a measurement head used in the system in FIG. 2, FIG. 5 is a schematic illustration of the images filmed by the system in FIG. 2, FIG. 6 is an assembly process for a ball bearing using the assembly line in FIG. 1, FIGS. 7A and 7B are perspective views of two ring halves each equipped with circular tracks whose diameters are able to be measured by means of the system in FIG. 2, and FIG. 8 is a schematic perspective-view illustration of one embodiment in which the system in FIG. 2 is adapted for measuring the diameter of a circular track on the outside of a ring.

FIG. 1 shows an assembly line 4 for automated assembly of a ball bearing. In the following part of this description, the features and functions well known to those skilled in the art will not be described in detail.

The assembly line 4 comprises a succession of automated cells each designed for performing specific assembly operations. In order to simplify FIG. 2, only one manufacturing cell 6 for an external ball bearing ring and one cell 10 for assembly of the ball bearing have been shown. The cell 6 is a conventional cell and will not be described in more detail.

The cell 10 comprises:
a station 12 for the automatic supply of the cell 10 with external bearing rings, a station 14 for measuring the diameter of a ball racetrack provided in the external ring, a station 16 for assembling the external ring with the balls for the ball bearing and an internal retaining ring, a station 18 for assembling the internal ring of the bearing a station 20 for evacuation of the assembled bearings toward other cells of the assembly line 4, and a robot 22 capable of moving the external bearing ring from the station 12 to the station 20 via the stations 14 and 16, in that order, without releasing the external bearing ring.

The station 12 is, for example, formed from a conveyer belt 24 for bringing the external rings near to the robot 22 and of a controller 26 for this conveyer belt.

The station 14 is equipped with a measurement head 28 for measuring the diameter of the ball racetrack and with a controller 30 designed for controlling the measurement head.

The station 16 is operationally coupled to a ball supply device 32 and to an internal ring supply device 34, respectively.

The station 20 is, for example, formed from a conveyer belt 36 for evacuating the assembled ball bearings from the cell 10, and from an evacuation controller 38 for controlling the belt 36.

The robot 22 is formed from a fixed base and from a manipulator arm 42 supported by the base 40.

The arm 42 is articulated about at least two axes and its mass is greater than 20 kg. The static precision of the movements of the robot is higher than $\frac{1}{100}$ mm and typically higher than $\frac{3}{100}$ mm. Compared with the precision of the measurement of the diameter that it is desired to achieve, which is less than 10 μm and, preferably, less than or equal to 1 μm, this static precision is at least ten times higher than the desired precision in the measurement of the diameter.

It is assumed here that the base 40 is fixed with no degree of freedom to a horizontal plane.

Here, the arm 42 is articulated about six axes of rotation 44 to 49. The axis 44 is a vertical axis forming part of the base 40 and about which a first segment 50 of the arm 42 pivots.

The axis 45 is a horizontal axis fixed to the segment 50 and about which a second segment 52 of the arm 42 pivots.

The axis 46 is also a horizontal axis fixed to one end of the segment 52 and about which a third segment 54 of the arm 42 pivots.

The axis 47 is an axis longitudinal to the segment 54 and intersects the axis 46 at a right angle. The segment 54 rotates about this axis 47.

The axis 48 is an axis perpendicular to the axis 47 fixed to the end of the segment 54 and about which a fourth segment 56 of the arm 42 pivots.

Lastly, the axis 49 is an axis fixed to the segment 56 and about which a gripping mechanism, disposed on the end of the arm 42, pivots. Here, this mechanism is a pincer 60 capable of grasping and holding an external ring and, alternately, releasing it.

The movements of the arm about these various axes are controlled by a robot controller 62.

This cell 10 also comprises a cell controller 64 for controlling the various workstations of this cell in such a manner as to assemble a ball bearing. For this purpose, the controller 64 is connected to each of the controllers 26, 30, 38 and 62 together with the station 16 and supply devices 32 and 34. The controller 64 is, for example, formed from a programmable electronic computer capable of controlling the execution of the method in FIG. 7. For this purpose, the controller 64 is connected to a memory 66 comprising instructions for the execution of the method in FIG. 7, when these instructions are executed by the electronic computer.

FIG. 2 shows a system 70 for measuring the diameter of a circular track of an external bearing ring 72 assembled in the cell 10. In FIG. 2, the elements already described with reference to FIG. 1 carry the same numerical references.

This system 70 comprises the robot 22, the measurement station 14 and also, as the case may be, the controller 64 of the cell.

As illustrated here in more detail, the robot 22 is capable of positioning the ring 72 around the measurement head 28 and of moving this ring 72 during the measurement.

The controller 30 comprises a control unit 74 for the measurement head 28 together with a processor 76 for processing the images acquired by the head 28.

The head 28 is equipped with two sources 80 and 82 of collimated light each designed to project a luminous pattern onto the track of the bearing ring 72. The sources therefore each produce a light-wave beam whose wavefront is plane. Here, these sources 80 and 82 respectively produce plane light beams 84 and 86. The term "plane light beam" here denotes a beam of light capable of projecting a luminous line whose width is small compared with its length. For example, the width of the luminous line is ten times smaller than its length, when this beam is directed onto a plane perpendicular to its direction of propagation. The luminous lines obtained are aligned parallel to a vertical axis Z belonging to the head 28.

Here, the sources 80 and 82 are, for example, sources of coherent monochromatic beams such as lasers.

The sources 80 and 82 are disposed symmetrically on either side of the Z axis.

The directions of propagation of the beams 84 and 86 are collinear with the axis and perpendicular to the Z axis. The directions of propagation of the beams 84 and 86 are opposing.

The plane defined by the Y and Z axes is henceforth referred to as "measurement plane".

FIG. 3 shows, in more detail, the bearing ring 72 together with the positioning of the sources 80 and 82 with respect to this ring. In FIG. 3, the axis of rotation 90 of the ring 72 is vertical.

A bearing racetrack 92 is sunk into the internal circumference of the bearing ring 72. This track 92 is toroidal. It is here designed to receive the balls for the ball bearing that is to be assembled.

The section of the track 92 in a horizontal plane forms a circle whose center O is situated on the axis of revolution 90.

The diameter Φ of the track 92 is measured from track bottom to track bottom.

The vertical section of this track 92 in the measurement plane forms two circular arcs on either side of the Z axis.

As illustrated in more detail in the case of the source 82, the beam 86 intersects the track 92. Thus, a luminous line 96 is formed at the intersection of the measurement plane and the track 92. The measurement plane is parallel to the axis 90.

FIG. 4 shows a top view of the measurement head 28 disposed inside the bearing ring 72 in the particular case where the axis of revolution 90 is coincident with the Z axis of the head 28.

The measurement head comprises two sensors 97 and 98 each designed for measuring the distance separating them from the bottom of the track 92. These sensors 97 and 98 are fixed to a support 100 with no degree of freedom.

More precisely, these sensors 97 and 98 are formed, here, by the association of the sources 80 and 82 with the cameras 102 and 104, respectively, each capable of filming the luminous line resulting from the intersection of the beams 84 and 86 with the track 92.

In the following part of this description, the center and the radius of the circular arc of the image of the reflection of the beam on the portion of track situated on the left of the Z axis are respectively denoted C1 and R1. With regard to the center and the radius of the circular arc of the image of the reflection of the beam on the portion of track situated on the right of the Z axis, these are denoted C2 and R2, respectively.

For this purpose, the cameras 102 and 104 are equipped with sightlines, 106 and 108 respectively, directed toward the track 92 and oriented in space in such a manner as to intersect the beams 84 and 86 at the level of the track 92. These sightlines 106 and 108 must form a non-zero angle with the Y direction is such a manner that the luminous lines filmed produce circular arcs, 110 and 112 respectively, (FIG. 5) in the images filmed by the cameras 102 and 104. By way of example, the angle between the Y direction and the sightlines 106 and 108 is greater than 300 and preferably equal to 45° in the plane formed by the X and Y axes. The X axis is the axis orthogonal to the Y and Z axes.

The cameras 102 and 104 are fixed to the support 100 with no degree of freedom.

By way of example, the cameras 102 and 104 are CCD (Charge-Coupled Device) sensors.

When the diameter Φ is measured, the bearing ring 72 is moved along the circular path 116 whose center is situated on the axis 44. This path 116 belongs to the X, Y plane and comprises:
- a point P0 at more than 1 millimeter below the Y axis,
- a point P1 situated, for example, at 0.5 millimeters below the Y axis,
- a point P2 situated at 0.5 millimeters above the Y axis, and
- a point P4 situated, for example, at 1 millimeter above the Y axis.

The section of the path 116 included between the point P1 and P2 forms a measurement trajectory 118. The trajectory 118 is chosen such that the axis 90 passes through the measurement plane during the movement of the ring 72.

Limits 120 and 122 parallel to the Y axis define between them a region inside which the center O of the ring 72 must be held for the images acquired by the cameras 102 and 104 to remain sharp and fully usable by the measurement system.

The distance $t_i$ corresponds to the distance from track bottom to track bottom in the measurement plane.

FIG. 5 shows images 130 and 132 respectively acquired by the cameras 102 and 104. The position of a pixel within the image 130 is located in an orthonormal reference frame having an origin O1 and axes Y1, Z1 respectively aligned on the Y and Z axes.

In a similar manner, the position of a pixel in the image 132 is located in an orthonormal reference frame having an origin O2 and axes Y2, Z2 respectively aligned on the Y and Z axes.

The distance d between the origins O1 and O2 is fixed since the cameras 102 and 104 are fixed to the same rigid support 100. This distance d is known. For example, the distance d is determined experimentally by means of a standard reference ring or by other means.

The circular arc 110 has as center the point C1 and as radius the radius R1.

The circular arc 112 has as center the point C2 and as radius the radius R2.

The limits 120 and 122 correspond in the image 130 to limits 134 and 136 inside which the point C1 must be situated in order to guarantee that the acquired image is sharp and that its processing is carried out under suitable conditions.

The operation of the assembly line 4 will now be described with reference to the process in FIG. 6.

Here, the procedure for assembling a ball bearing starts with a step 150 for manufacturing the external bearing ring 72 by the cell 6.

Subsequently, in a step 152, the station 12 automatically transports the bearing ring 72 from the cell 6 as far as a point where it can be grasped by the robot 22. Once at this point, in a step 154, the robot 22 grasps and holds the ring 72 with its pincer 60 then transports it as far as the station for measuring the diameter Φ. Then begins a phase 156 for measuring this diameter Φ. At the start of the phase 156, in a step 158, the robot 22 places the ring 72 such that the center O is coincident with the position PO.

Then, the robot continuously moves the ring 72 in such a manner that the center O follows the path 116 from the point P0 toward the point P4. More precisely, in a step 160, the robot 22 accelerates the movement of the ring 72 over the portion of the path included between the points P0 and P1 such that the ring 72 reaches a pre-determined speed.

Then, when it follows the trajectory 118 between the points P1 and P2, in a step 162, the robot 22 is controlled in such a manner that the movement of the ring 72 over this portion of the trajectory 116 is executed with a constant instantaneous speed.

Once it has arrived at the point P2, in a step 164, the robot 22 decelerates the movement of the ring 72 such that the latter comes to a stop at the point P4.

All through the steps 160, 162 and 164, only the articulation of the robot 22 allowing it to pivot about the axis 44 is controlled.

When the point P4 has been reached, in a step 166, the robot 22 then transports the ring 72 to the assembly station 16.

In parallel with the step 162, in a step 170, the cameras 104 and 106 simultaneously acquire the images 130 and 132.

Subsequently, the distance $t_i$ is calculated by triangulation. For example, in a step 172, the position of the points C1 and C2 within the images 130 and 132, together with the value of the radii R1 and R2, are calculated based on the shape of the circular arcs 110 and 112. For this purpose, a least-squares method may be used.

At that stage, in a step 174, the processor 76 checks whether or not the coordinates of the point C1 are included between the limits 134 and 136. In the affirmative case, in a step 176, the processor 76 calculates the distance $t_i$ based on the position of the points C1 and C2, on the value of the radii R1 and P2 determined during the step 172 and on the value of the distance d. In the step 176, the value of the distance $t_i$ is recorded.

If the point C1 is not situated between the limits 134 and 136, in a step 178, via the controller 64, the unit 74 causes the ring 72 to move along the Y direction in order to bring the center O back between the limits 120 and 122. In this step 178, the controller 62 commands the arm 42 to move as a function of the position of the point C1 measured during the step 172.

When the step 176 or the step 178 has been completed, the process returns to the step 170.

The steps 170 to 178 are repeated several times and at regular time intervals as the trajectory 118 is followed. For example, the trajectory 118 comprises more than a hundred measurement points and, preferably, more than a hundred and twenty measurement points. The measurement points are the locations where the measurements of the distance $t_i$ are carried out.

Here, the measurements of the distance $t_i$ are only performed over the trajectory 118. In parallel with the steps 164 and 166, the processor 76 now executes a step 180 for analyzing the coherence of the measured distances $t_i$ designed to eliminate the atypical values measured. Such atypical values may be caused by the presence of dust or other pollutants on the surface of the track 92. For example, at the start of the step 180, during an operation 182, the processor 76 calculates the diameter Φ based on all the distances $t_i$ measured and on information representative of the distance separating each measurement point. For example, the processor 76 determines by the least-squares method the equation of the circle that best approximates the variation of the distances $t_i$ as a function of the measurement points. The value of the diameter sought is the maximum of the curve that can be placed between two measurement points and that allows it to be accurately calculated. Here, the circular approximation will be all the more accurate the more constant the time intervals between measurements, in other words the more constant the speed of the movement.

During the operation 182, the processor 76 also calculates the standard deviation of the measured distances $t_i$ with respect to the theoretical distance $t'_i$ that should have been measured, this theoretical distance being obtained from the diameter Φ previously calculated. Subsequently, in an operation 184, the processor 76 eliminates the measured distances $t_i$ that are situated at more than two standard deviations from the corresponding theoretical value that should have been measured.

When the step 180 has been completed, in a step 186, the processor 76 determines once again the diameter Φ using, for this purpose, only the measurements that have not been eliminated in the step 180. The method implemented for calculating the diameter Φ in the step 186 is, for example, the same as that implemented during the operation 182. The phase 156 has then been completed.

Once the diameter Φ has been measured, in a step 190, the controller 64 sends commands to the station 16 depending on this measured diameter Φ.

In response to these commands, in a step 192, the station 16 selects the balls having a diameter adapted to the measured diameter Φ, then assembles these balls and the external and internal bearing rings.

Once the ball bearing has been assembled, in a step 198, the robot 22 transports the assembled ball bearing as far as the station 20. In a step 200, the station 20 evacuates the assembled ball bearing toward other cells of the assembly line.

Starting from the step 154, up to the step 198, the robot 22 never releases the bearing ring 72, which allows the assembly of the ball bearing to be considerably accelerated.

Numerous other embodiments are possible. For example, the sensors 97, 98 may be constructed using other technologies than those implementing collimated light beams. For example, ultrasound sensors could be used.

It is not obligatory for the images to be acquired at regular intervals of time. Nor is it necessary for the instantaneous speed when following the trajectory 118 to be constant. On the other hand, the instantaneous acceleration must remain continuously either greater than or equal to zero, or else less than or equal to zero when following this trajectory 118. For example, as a variant, the robot 22 continuously accelerates from the point P1 to the point P2. Under these conditions, if it is desired that the distance traveled by the center O between two times when images are acquired remain constant, the time intervals at which the images are taken must be shortened as the speed of the center O increases.

Here, the procedure in FIG. 6 has been described in the particular case where the images acquired by the cameras 102 and 104 are processed immediately in order to deduce the distance $t_i$. As a variant, the images are recorded and post-processed, for example, when the center O is no longer following the trajectory 118.

The measurement system and method described here can be adapted for measuring the diameter of a track 204 (FIG. 7A) having a rectangular transverse cross-section or the inside diameter of a cylinder 206 (FIG. 7B).

The system and the method described here can also be adapted for measuring the diameter of a track 208 (FIG. 8) sunk into the external circumference of a ring 210. For example, for this purpose, when the diameter of the track is measured, the sources 80 and 82 are situated outside of the ring 210 rather than inside as in FIG. 4.

The measurement system and method described here are not limited to the measurement of circular tracks of rings but may also be adapted for measuring the diameter of all types of cylinders or tubes.

The diameter measured, rather than being used for matching the components to be assembled, may also be used for controlling the quality of the manufactured ring. In that case, the measured diameter is, for example, used for rejecting the components whose inside diameter measured is not included within a pre-determined range. The measured diameter of the component may also simply be stored with a view to being used in other later manufacturing steps. In that case, the station downstream of the measurement system can simply be a station for receiving the component.

The measurement head 28 may comprise more than two sensors. For example, as a variant, this measurement head comprises three sensors whose measurement directions are offset with respect to one another by $2\pi/3$ radians.

The system 4 has been described in the particular case where the controller 30 communicates with the controller 62 via the controller 64. As a variant, the controller 30 is directly connected to the controller 62 in such a manner as to communicate with the latter without going via the cell controller.

Lastly, the time saving achieved in the assembly process, by using the same robot for moving the ring along the measurement trajectory and for transporting the component from one assembly station to another, is obtained even if the robot does not move the component along the measurement trajectory with a continuously non-zero instantaneous speed and an instantaneous acceleration that does not change sign. Accordingly, as a variant, if only a time saving in assembly is sought without being accompanied by an improvement in the measurement precision of the diameter of the track, the measurement system or method does not implement the features required for increasing the precision of the measurement.

The invention claimed is:

1. A method for measuring the diameter of a circular track on a component, this method comprising:
   a) a step for moving the component along a measurement trajectory,
   b) when the component is moved along the measurement trajectory, a step for measuring, without contact with the component, at least one quantity that is a function of the diameter of the circular track,
   c) a step for determining the diameter of the circular track based on the quantities measured at several measurement points along the measurement trajectory,
   wherein the step a) is carried out by means of a robot formed from a fixed base and from a manipulator arm articulated about at least two axes, the end of the manipulator arm being equipped with a gripping mechanism capable of grasping and holding the component, and in that, during the step a), the robot moves the component in a continuous manner with an instantaneous speed which is never zero along the measurement trajectory and an instantaneous acceleration which never changes sign along the measurement trajectory.

2. The method as claimed in claim 1, in which, during the measurement step, at least two quantities are simultaneously measured with respective sensors at each measurement point along the measurement trajectory, each of these quantities is representative of the which separates the sensor that has measured it from the circular track in a measurement direction, the measurement directions used to measure these two quantities being opposing and the distance between the sensors being kept constant.

3. The method as claimed in claim 1, in which the step a) (162) is carried out by means of a robot whose articulated arm has a mass greater than or equal to 20 kg.

4. The method as claimed in claim 1, in which, during the step a), only one articulation of the robot is controlled.

5. The method as claimed in claim 1, in which the step b) is carried out by means of at least one sensor comprising:
   a source of a collimated light beam for projecting a luminous pattern (96) onto the circular track,
   a camera for acquiring an image of the luminous pattern projected onto the circular track, and
   by means of a processor for processing the acquired images in order to deduce from these the quantity that is a function of the diameter of the circular track.

6. The method as claimed in claim 1, in which the step a) is carried out with an arm whose static positioning error with respect to a given position is strictly greater than the maximum acceptable error on the measurement of the diameter of the circular track, the static positioning error being the maximum error obtained between a target position for the gripping mechanism and a position at which the gripping mechanism actually stops when the robot tries to place this mechanism on the target position.

7. A system for measuring the diameter of a circular track on a component as claimed in claim 1, this system comprising:
   at least one sensor for measuring, without contact with the component, when the component is moved along a measurement trajectory, a quantity that is a function of the diameter of the circular track, and
   a processor for determining the diameter of the circular track from the quantities measured at several measurement points along the measurement trajectory, wherein this system also comprises:
   an articulated robot formed from a fixed base (40) supporting a manipulator arm articulated about at least two axes, the end of the manipulator arm being equipped with a gripping mechanism for grasping and holding the component, this robot being for moving the component along the measurement trajectory, and
   at least one controller for implementing a measurement method.

8. An assembly line for a component having a circular track, this line comprising:
   an upstream station for the automatic supply of components to be assembled
   a system for measuring the diameter of the circular track of the component to be assembled, and
   a downstream station for processing the component according to the measured diameter of the circular track or for receiving the component,
   wherein the measurement system is as claimed in claim 7 and in that the robot used in the measurement system is also for automatically transferring the component from the upstream station toward the measurement system and from the measurement system toward the downstream station with no human intervention and without releasing the component.

9. The line as claimed in claim 8, in which the processing station is a station for assembling the component with complementary components selected according to the diameter measured.

10. The line as claimed in claim 9, in which the component is a bearing ring of a ball bearing comprising a circular track designed to receive the balls and in which the complementary components are the set of balls received in the circular track and the other retaining ring of the bearing.

* * * * *